United States Patent
Tunwattanapong (10) Patent No.: US 11,715,221 B2
(45) Date of Patent: Aug. 1, 2023

(54) SYSTEM AND METHOD FOR ACQUISITION OF THREE-DIMENSIONAL INFORMATION OF BODY PARTS

(71) Applicant: LUMIO 3D CO., LTD., Ubonratchathani (TH)

(72) Inventor: Borom Tunwattanapong, Ubonratchathani (TH)

(73) Assignee: LUMIO 3D CO., LTD., Ubonratchathani (TH)

( * ) Notice: Subject to any disclaimer, the term of this patent is extended or adjusted under 35 U.S.C. 154(b) by 48 days.

(21) Appl. No.: 17/264,988

(22) PCT Filed: Dec. 29, 2020

(86) PCT No.: PCT/IB2020/062500
§ 371 (c)(1),
(2) Date: Feb. 1, 2021

(87) PCT Pub. No.: WO2021/137142
PCT Pub. Date: Jul. 8, 2021

(65) Prior Publication Data
US 2022/0180540 A1    Jun. 9, 2022

Related U.S. Application Data

(60) Provisional application No. 62/956,413, filed on Jan. 2, 2020.

(51) Int. Cl.
| | | |
|---|---|---|
| G06T 7/70 | (2017.01) | |
| G06T 7/521 | (2017.01) | |
| G06T 7/55 | (2017.01) | |
| G06T 7/90 | (2017.01) | |
| G06T 17/20 | (2006.01) | |

(Continued)

(52) U.S. Cl.
CPC ............... *G06T 7/521* (2017.01); *G06T 7/55* (2017.01); *G06T 7/70* (2017.01); *G06T 7/90* (2017.01); *G06T 17/20* (2013.01); *H04N 23/56* (2023.01); *G06T 2207/10152* (2013.01); *G06T 2207/30196* (2013.01); *H04N 23/90* (2023.01)

(58) Field of Classification Search
None
See application file for complete search history.

(56) References Cited

U.S. PATENT DOCUMENTS

| | | | | |
|---|---|---|---|---|
| 5,777,244 A | * | 7/1998 | Kumagai | ............ G01N 21/951 |
| | | | | 73/865.8 |
| 2007/0258627 A1 | | 11/2007 | Geng | |
| 2011/0102550 A1 | | 5/2011 | Daniel et al. | |

(Continued)

OTHER PUBLICATIONS

International Search Report and Written Opinion dated Jul. 21, 2021 in International Application No. PCT/IB2020/062500.

*Primary Examiner* — Yanna Wu
(74) *Attorney, Agent, or Firm* — Kim IP Law Group LLC (57) ABSTRACT

The embodiments herein provide a method and a device for the acquisition of three-dimensional information of body parts. The method includes a step of processing an image of an object being exposed to a lighting condition or a sequence of lighting conditions adapted to extract at least two types of information selectable from a group. The group includes a silhouette of the object, a color of the object, a surface orientation of the object, and multi-spectral information of the object.

19 Claims, 4 Drawing Sheets

(51) Int. Cl.
*H04N 23/56* (2023.01)
*H04N 23/90* (2023.01)

(56) References Cited

U.S. PATENT DOCUMENTS

2012/0056994 A1* 3/2012 Fyffe .................... G06V 10/147
   348/47
2018/0165820 A1* 6/2018 Rhodes, Jr. ............ G01N 21/55

* cited by examiner

SYSTEM AND METHOD FOR ACQUISITION OF THREE-DIMENSIONAL INFORMATION OF BODY PARTS

CROSS-REFERENCE TO RELATED APPLICATIONS

The embodiments herein claim the priority of the US Provisional Patent Application (PPA) filed on Jan. 2, 2020, with the Ser. No. 62/956,413 with the title, "System and method for acquisition of three-dimensional information of body parts", and the contents of which are included in entirety as reference herein.

BACKGROUND

Technical Field

The embodiments herein are generally related to the field of image processing. The embodiments herein are more particularly related to acquiring the three-dimensional image information of an object.

Description of the Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

Acquiring accurate three-dimensional information of the human body is a long-standing problem in both research and industries. There are numerous applications in various fields. In the medical industry, doctors need accurate measurements of patients to diagnose and prepare treatments. For example, plastic surgeons could use three-dimensional information of patients to make a plan before an operation. On the other hand, using three-dimensional information for visualization, such as 3D ultrasound or MRI, also help patients understand the symptom and treatment better. In the entertainment industry, people use three-dimensional information of the human body to create realistic CGI for movies and advertisements. In manufacturing, shoemakers use three-dimensional information of customers' feet to create custom-fit shoes. As a result, accurate three-dimensional information of the human body part plays important role in the innovation of the various industry.

Various systems and methods for the acquisition of three-dimensional information of human parts are known in the prior arts. Structured light is used with cameras to triangulate the surface location in three-dimensional. Handheld laser scanners are used to acquire the distance of the surface from the sensor. Time-of-flight cameras are also used for acquiring the distance of the surface to the camera. However, these systems only have one location of the camera, which requires users to move around to get more coverage when acquiring three-dimensional information. For multiple-camera setup, photogrammetry employs overlapping information between several cameras to reconstruct three-dimensional information of the part. This type of setup can acquire multiple areas of three-dimensional information simultaneously. However, the setup requires a high number of zoom-in cameras which is not feasible in some applications. The method to reconstruct three-dimensional information also suffers artifacts on surface smoothness in some areas.

This specification recognizes there is a need for an efficient method and device which eliminates the problems of existing devices and methods to improve the quality of three-dimensional information obtained.

The above-mentioned shortcomings, disadvantages, and problems are addressed herein and which will be understood by reading and studying the following specification.

SUMMARY

The various embodiments herein provide a method and a device for the acquisition of three-dimensional information of body parts.

According to an embodiment herein, the method includes a step of processing an image of an object being exposed to a lighting condition or a sequence of lighting conditions adapted to extract at least two types of information selectable from a group. The group includes a silhouette of the object, a color of the object, a surface orientation of the object, and multi-spectral information of the object.

In an aspect, the surface orientation of the object is corresponding to a direction that is substantially perpendicular to a plane representing a given point on the object's surface.

In an aspect, the lighting condition or the sequence of lighting conditions is adapted to extract at least three types of information selectable from the group.

In an aspect, the lighting condition or the sequence of lighting conditions is adapted to extract at least the surface orientation of the object.

In an aspect, the lighting condition or the sequence of lighting conditions is emitted from a light source facing the object from multiple directions at a substantially uniform distance.

In an aspect, the object is a body part.

In an aspect, the method further includes a step of forming a three-dimensional model of the object.

In an aspect, the three-dimensional model of the object is formed based upon the image's feature cues and information extracted by the lighting condition or the sequence of lighting conditions.

In an aspect, the three-dimensional model of the object is formed from a mesh registration. Said mesh registration is based on a camera configuration and the image's feature cues.

In an aspect, the three-dimensional model of the object is formed from a mesh registration, said mesh registration is based on a secondary registration point. Said secondary registration point is based on a camera configuration and a primary registration point, and said camera configuration and said primary registration point are based on the image's feature cues.

In an aspect, the information extracted by the lighting condition or the sequence of lighting conditions is applied to the mesh registration to form the three-dimensional model of the object.

An aspect of the present disclosure relates to a device for the acquisition of three-dimensional information of body parts. The device includes an image-capturing unit, a processor, and a lighting unit. The image-capturing unit is adapted to capture an image of an object substantially synchronously from a plurality of angles. The processor is adapted to process the image. The lighting unit is adapted to expose the object to a lighting condition or a sequence of lighting conditions adapted to extract at least two types of information selectable from a group. The group includes a silhouette of the object, a color of the object, a surface orientation of the object, and multi-spectral information of the object.

In an aspect, the lighting unit is a light-emitting pane further adapted to face the object from multiple directions at a substantially uniform distance.

In an aspect, the light-emitting pane is a dome having its internal surface adapted to expose the object to the lighting condition or the sequence of lighting conditions.

In an aspect, the dome is a polyhedral dome.

In an aspect, the image-capturing unit is attached to the lighting unit.

In an aspect, the lighting condition or the sequence of lighting conditions is adapted to extract at least three types of information selectable from said group.

In an aspect, the lighting condition or the sequence of lighting conditions is adapted to extract at least the object's surface orientation.

In an aspect, the processor is adapted to process the image to form a three-dimensional model of the object based upon the image's feature cues and information extracted by the lighting condition or the sequence of lighting conditions.

In an aspect, the three-dimensional model of the object is formed from a mesh registration. Said mesh registration is based on a camera configuration and the image's feature cues.

In an aspect, the three-dimensional model of the object is formed from a mesh registration. Said mesh registration is based on a secondary registration point, said secondary registration point is based on a camera configuration and a primary registration point, and said camera configuration and said primary registration point are based on the image's feature cues.

In an aspect, the information extracted by the lighting condition or the sequence of lighting conditions is applied to the mesh registration to form the three-dimensional model of the object.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The principle of the present invention and its advantages will become apparent in the following description, taking into consideration the accompanying drawings in which.

Although the specific features of the embodiments herein are shown in some drawings and not in others, this is done for convenience only as each feature may be combined with any or all of the other features in accordance with the embodiments herein.

DETAILED DESCRIPTION OF THE EMBODIMENTS HEREIN

It is to be understood that the following detailed description will be directed to embodiments, provided as examples for illustrating the concept of the present invention only. The present invention is not limited to particular embodiments described, as such may, of course, vary. It is also to be understood that the terminology used herein is for the purpose of describing particular embodiments only, and is not intended to be limiting, since the scope of this invention will be limited only by the appended claims.

The detailed description of the embodiments is divided into various sections only for the reader's convenience and disclosure found in any section may be combined with that in another section.

It must be noted that as used herein and in the appended claims, the singular forms "a", "an", and "the" include plural referents unless the context clearly dictates otherwise.

Unless defined otherwise, all technical and scientific terms used herein have the same meaning as commonly understood by one of ordinary skill in the art to which this invention belongs. As used herein the following terms have the following meanings.

The term "about" when used before a numerical designation, e.g., temperature, time, amount, concentration, and such other, including a range, indicates approximations which may vary by (+) or (−) 10%, 5%, or 1%, or any sub-range or sub-value therebetween.

"Comprising" or "comprises" is intended to mean that the compositions and methods include the recited elements, but not excluding others. "Consisting essentially of" when used to define compositions and methods, shall mean excluding other elements of any essential significance to the combination for the stated purpose. Thus, a device or method consisting essentially of the elements as defined herein would not exclude other materials or steps that do not materially affect the basic and novel characteristic(s) of the claimed invention. "Consisting of" shall mean excluding more than trace elements of other ingredients and substantial method steps. Embodiments defined by each of these transition terms are within the scope of this invention.

The term "artifacts" is intended to mean substantial imaging errors or visible systematic errors that can be noticeable and easily differentiate from a non-error area of the image.

The term "extract", when used with other information description, indicate a method or process to obtain meaningful information description from the input information. It can be assumed that input information is images capture from the scanning process unless stated otherwise.

The term "multi-spectral" indicates light in various spectrums including visible and non-visible light spectrum. The light used in this system is infrared (IR) light, visible light, and ultraviolet (UV) light.

The term "feature cues" indicates a unique and identifiable feature of the surface captured in the images.

The term "surface point" refers to an actual three-dimensional location of a point lying on the surface of a scanned body part.

The term "surface information" refers to information captured and extracted when imaging the surface of the scanned body part. The term specifically indicates information in the form of images.

A method and device are provided for the acquisition of three-dimensional information of body parts from multiple angles simultaneously. The method in accordance with the present invention includes a step of processing an image of an object being exposed to a lighting condition or a sequence of lighting conditions adapted to extract at least two types of information selectable from a group. The group includes a silhouette of the object, a color of the object, a surface orientation of the object, and multi-spectral information of the object. In an embodiment, the object is a body part. In an embodiment, the surface orientation of the object is corresponding to a direction that is substantially perpendicular to a plane representing a given point on the object's surface. In an embodiment, the lighting condition or the sequence of lighting conditions is adapted to extract at least three types of information selectable from the group.

In an embodiment, the lighting condition or the sequence of lighting conditions is adapted to extract at least the surface orientation of the object. In an embodiment, the lighting condition or the sequence of lighting conditions is emitted from a light source facing the object from multiple directions at a substantially uniform distance. In an embodiment, the method further includes a step of forming a three-dimensional model of the object. In an embodiment, the three-dimensional model of the object is formed based upon the image's feature cues and information extracted by the lighting condition or the sequence of lighting conditions. In an embodiment, the three-dimensional model of the object is formed from a mesh registration. Said mesh registration is based on a camera configuration and the image's feature cues.

In an embodiment, the three-dimensional model of the object is formed from a mesh registration. Said mesh registration is based on a secondary registration point, said secondary registration point is based on a camera configuration and a primary registration point, and said camera configuration and said primary registration point are based on the image's feature cues. In an embodiment, the information extracted by the lighting condition or the sequence of lighting conditions is applied to the mesh registration to form the three-dimensional model of the object.

The device in accordance with the present invention acquires three-dimensional information of the body parts. The device includes an image-capturing unit, a processor, and a lighting unit. In an embodiment, the device in accordance with the present invention is a scanner system. The image-capturing unit is adapted to capture an image of an object substantially synchronously from a plurality of angles. The processor is adapted to process the image. The lighting unit is adapted to expose the object to a lighting condition or a sequence of lighting conditions adapted to extract at least two types of information selectable from a group. The group includes a silhouette of the object, a color of the object, a surface orientation of the object, and multi-spectral information of the object. In an embodiment, the image-capturing unit is one or more cameras. The cameras and lighting unit work synchronously to obtain surface information of the object at the instantaneous moment. The cameras and lighting unit are set up in a semi-spherical shape to capture the object at about the center from multiple directions.

In an embodiment, the lighting unit is a light-emitting pane further adapted to face the object from multiple directions at a substantially uniform distance. In an embodiment, the light-emitting pane is a dome having its internal surface adapted to expose the object to the lighting condition or the sequence of lighting conditions. The dome in an embodiment is a polyhedral dome. In an embodiment, the image-capturing unit is attached to the lighting unit. In an embodiment, the lighting condition or the sequence of lighting conditions is adapted to extract at least three types of information selectable from the group. In an embodiment, the lighting condition or the sequence of lighting conditions is adapted to extract at least the object's surface orientation. In an embodiment, the processor processes the image to form a three-dimensional model of the object based upon the image's feature cues and information extracted by the lighting condition or sequence of lighting conditions. In an embodiment, the three-dimensional model of the object is formed from a mesh registration, said mesh registration being based on a camera configuration and the image's feature cues. In an embodiment, the three-dimensional model of the object is formed from a mesh registration. Said mesh registration is based on a secondary registration point, said secondary registration point is based on a camera configuration and a primary registration point, and said camera configuration and said primary registration point are based on the image's feature cues. The information is extracted by the lighting condition or the sequence of lighting conditions is applied to the mesh registration to form the three-dimensional model of the object.

In an embodiment, the captured surface information includes high precision surface orientation, color detail, and multi-spectral information. The surface information captured from the scanner system is processed to extract multiple feature cues of the surface. These feature cues are then used to indicate the exact location of the surface from multiple cameras. After that, the three-dimensional surface can be constructed, preferably by triangulating the corresponding location of the surface between different camera views. The result is high-resolution three-dimensional information of the body part which includes multi-spectral color detail. The device and method can also eliminate the need to have a high number of overlapping cameras which would cause artifacts in smooth areas.

According to the concept of the present invention, it would be ideal to configure the device to have lighting and the camera panel that is truly semi-spherical (i.e. lighting unit and cameras being located on a single smooth surface, continuously arching around and about the center of a space at which the object of imaging is located) because such configuration would provide an equal distance between the object of imaging and the lighting/each camera, minimizing the optical or spectral inaccuracies that may arise from an uneven distance and thus providing the theoretically most accurate imaging results. However, the following description will be directed to example embodiments in which the lighting and camera panel collectively has an imperfect semi-spherical configuration that is nevertheless sufficiently close to the ideal configuration to provide an ease of construction while achieving the technical effects as intended by the concept of the present invention.

Figure 1:
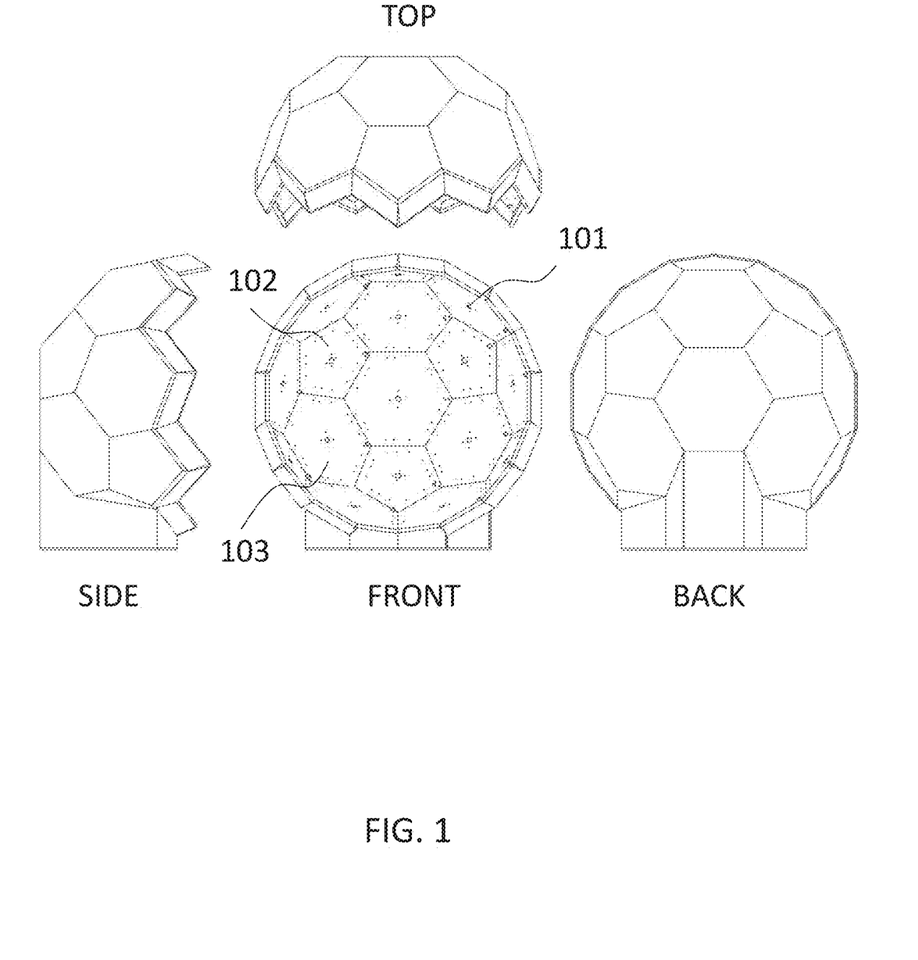
FIG. 1 is projected views from the front, top, side, and back of a scanner system configured to acquire three-dimensional information of body parts, in accordance with an embodiment.

Referring now to the Figures, exemplary device components according to an embodiment of the present disclosure are shown in FIG. 1. FIG. 1 is projected views from the front, top, side, and back of a scanner system configured to acquire three-dimensional information of body parts, in accordance with an embodiment. The scanner system includes cameras 101, preferably ranging from about 3 to 16 cameras, a polyhedral dome comprising hexagon LED panels 103 and pentagon LED panels 102. The cameras 101 are located at the center of each LED panel and aimed at the center of the system. Each camera consists of a high-resolution image sensor, S-mount lens, and a control unit which stores and process images from the camera before sending the information to a computer 201. The camera and lens need to be small enough not to occlude light from LED panels. The lens is also needed to be able to focus on close distance, about from 15 to 25 cm away from the sensors, to capture sharp images of the object with enough depth of field.

The number of cameras in the system is related to the application of the scan, for example, face scanning for plastic surgery would preferably require about 12 to 16 cameras to provide a whole face coverage, which includes forehead, eyes, nose, mouth, cheek, chin, ears and neck area. For dentistry, the coverage is on the frontal and lower part of the face, which includes the eyes, nose, mouth, cheek, and chin area, which preferably has about 12 cameras to provide coverage. For some applications that need to cover the only frontal face, such as security and advertisement, about 3 cameras are enough to provide coverage of eyes, nose, and mouth areas.

The lighting of the acquisition system consists of 16 LED panels of tightly packed white LEDs, infrared LEDs, and ultraviolet LEDs. There is 2 type of LEDs panels used in this system, hexagon 103 and pentagon 102 LED panels. In an example embodiment, the hexagon LED panel 103 contains 619 white LEDs, 6 infrared LEDs, and 6 ultraviolet LEDs. The pentagon LED panel 102 contains 381 white LEDs, 5 infrared LEDs, and 5 ultraviolet LEDs. There are 10 hexagons LED panels 103 and 6 pentagon LED panels 102 which are arranged in a form of the semi-truncated icosahedron, soccer ball, shape as can be seen in FIG. 1. This arrangement is to create a semi-spherical shape from a fixed number of identical shapes. Other arrangements could be a cube, snub cube, or pentakis dodecahedron which could be found from a list of Archimedean solids.

The arrangement in a spherical-like shape benefits in both the camera directions and lighting directions. The underlying concept is that cameras 101 arranged in a spherical-like shape can capture the object at the center of the sphere from all directions. Lighting systems, 102 and 103, arranged in a spherical-like shape can create even lighting conditions at the center of the sphere. By arranging cameras and lighting in a spherical-like shape, the system can capture surface information of the body part at the center with optimal efficiency regardless of the shape of the part. This setup is suitable to scan parts that are not certain in shapes and sizes.

Figure 2:
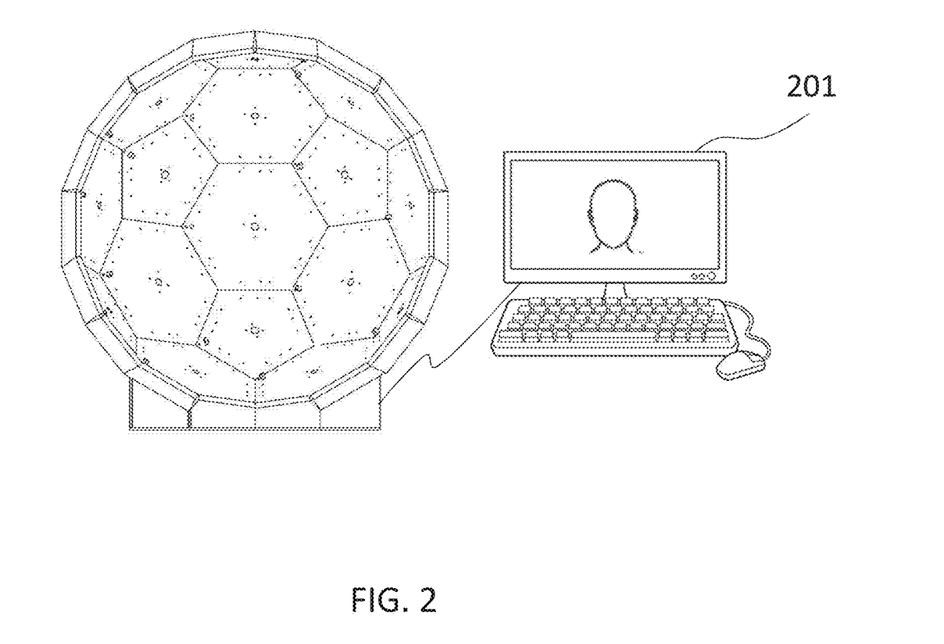
FIG. 2 is a front view of the scanner system connected to a computer with a monitor to control the scanner system to capture and process three-dimensional information, in accordance with an embodiment.
Figure 3A:
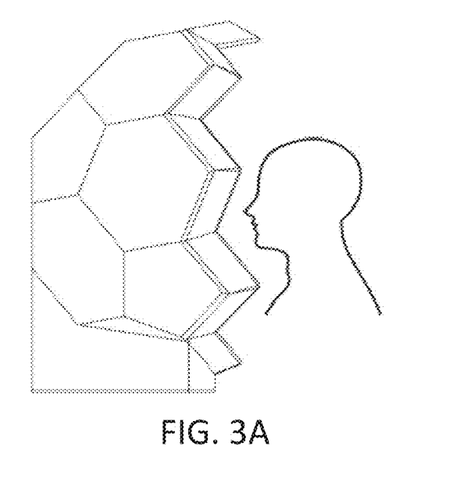
FIG. 3A-3D illustrate the usages of the scanner system to acquire different subject's body parts, in accordance with an embodiment.
Figure 3B:
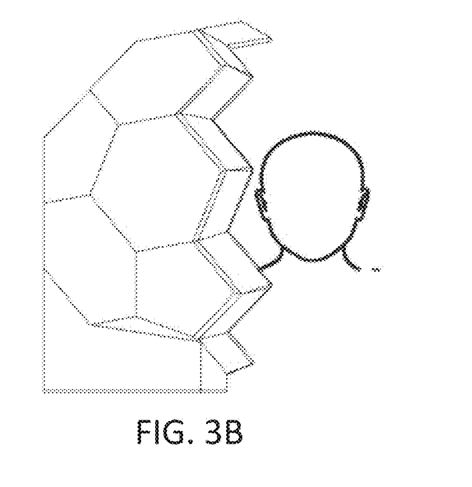
Figure 3C:
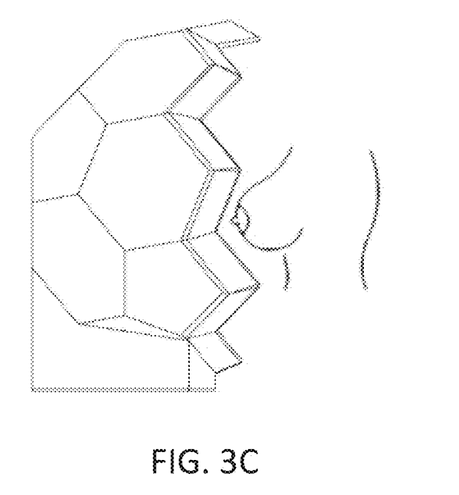
Figure 3D:
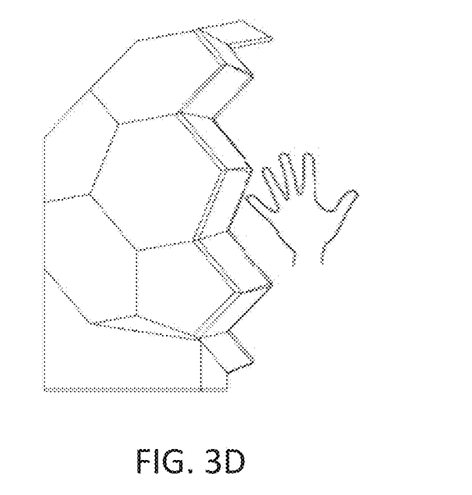

The acquisition process starts with 402 by positioning the subject body part at the center of the system (FIG. 3A-3D). The system is designed to be suitable to acquire various body parts, for example, faces in FIG. 3A, ears in FIG. 3B, breasts in FIG. 3C and hands in FIG. 3D. The display, 201 in FIG. 2, is connected to cameras 101 to show a live preview of cameras while positioning the subject. This way, the operator positions the subject's body part at the center area of the system which yields an optimal scanning result. After positioning is complete, the system operator starts the capturing process 403 by sending a capture command from a computer in FIG. 2. The cameras rapidly capture multiple images synchronous with the light from all directions. In each image captured, the lighting changes to different conditions.

Figure 4:
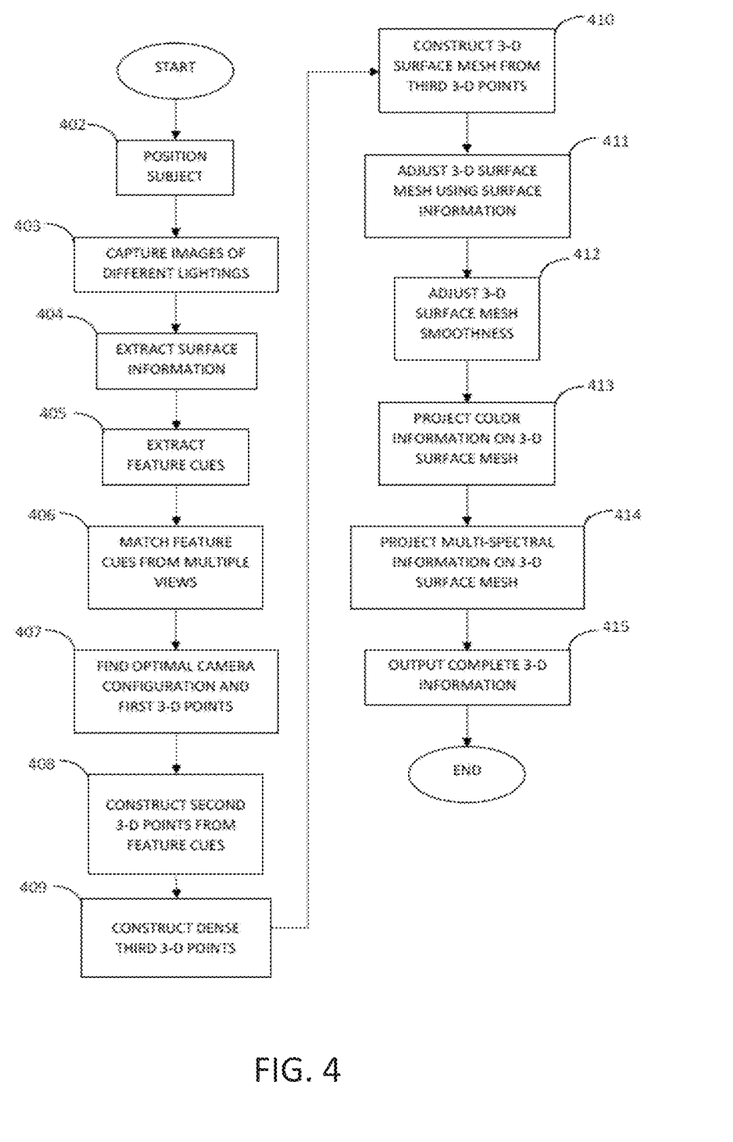
FIG. 4 illustrates a flowchart of a method to acquire three-dimension information of body parts, in accordance with an embodiment.

There are four types of information extracted from the lighting conditions used in this process.

Type 1 is silhouette information of the body part
Type 2 is color information of the body part
Type 3 is surface orientation information of the body part
Type 4 is multi-spectral information of the body part In an embodiment, Type 1 information is extracted by 2 lighting conditions which are a dark and bright light. The dark lighting condition is used to capture the subject's body part under environmental lighting. The bright light is used to capture the subject's body part under the system lighting accumulates with the environment lighting. Here, the lighting condition for extracting Type 1 information differentiates the background and subject's body part. The assumption is that the body part would be dark under dark lighting conditions and bright under bright lighting conditions where the background would not be affected by dark and bright lighting conditions.

In an embodiment, Type 2 information is extracted by of 7 lighting conditions which are 1 all-even brightness light and 6 spotlights from different LED panels. Here, the all-even brightness lighting condition is used to get uniform color information and the other 6 spotlighting conditions are used to get spot color information of the subject's body part.

In an embodiment, Type 3 information is extracted by 3 lighting conditions which are smoothly changing in brightness. Here, the first lighting condition is bright on the left side and dark on the right side. The second lighting condition is bright on the top side and dark on the bottom side. The third lighting condition is bright on the front side and dark on the rim side. These 3 lighting conditions can be used to indicate the surface orientation of the scanned subject's body part.

In an embodiment, Type 4 information is extracted by 2 lighting conditions. Here, the first lighting condition is even brightness light using infrared LEDs. The second lighting condition is even brightness light using ultraviolet LEDs. This type of lighting condition is used to extract multi-spectral information on the surface of the scanned subject's body part.

All the images captured are then processed in 404 to extract surface information from each camera. The surface information extracted includes silhouette, color information, surface orientation, and multi-spectral information. This information is used in process 405 to extract feature cues of the surface. These cues indicate the uniqueness of each surface point used in process 406 to correspond to the same surface point across multiple cameras (the product is hereinafter called "correspondences"). Based upon the correspondences, process 407 generates (i) the optimal camera configuration and (ii) the primary registration points, both of which are intended to be in agreement with each other. After that, process 408 uses optimal camera configuration along with the primary registration points to generate a secondary registration point at all the feature cue positions.

At this point, the system contains optimal camera configurations, as well as secondary registration points. This information is a necessary foundation for constructing complete three-dimensional information later in process 415. Process 409 uses the optimal camera configuration and the secondary registration points and extends the secondary registration points to generate the dense tertiary registration points which cover all parts of the surface of the scanned subject body part. This process 409 generates the dense tertiary registration points which cover more surface points but each point is not as accurate and reliable as the secondary registration points generated from 408. Therefore, process 410 constructs connections between each of the dense tertiary registration points from 409 and represents connections, preferably as triangle meshes, for all the dense tertiary registration points.

The three-dimensional surface mesh from 410 represents an overall surface location. However, it contains errors in some areas that have high curvature, or other natures of surface that may result in the deficiency of scanned data. Therefore, process 411 uses surface information from 404 to reduce errors of the three-dimensional surface mesh from 410. This results in a more accurate surface mesh location. Process 412 further reduces the errors of three-dimensional surface meshes in the smooth and/or curved areas. Process 412 makes sure that smooth areas are smooth and curve areas are curved.

At process 413, the system contains an accurate three-dimensional surface mesh of the subject body part. This three-dimensional surface mesh needs to be sufficiently accurate, such that the surface information from different cameras still agrees with each other, to proceed to a projection of color information. If the three-dimensional surface mesh contains high errors, the projection of color information on the three-dimensional surface mesh will contain artifacts. This problem is effectively avoided by optimizing the three-dimensional surface mesh in 411 and 412 such that the error is low enough and would not cause artifacts in 413. In some cases, the optimization could not produce the optimal solution, and the three-dimensional surface mesh from 412 still contains a high error. Therefore, projection process 413 needs to reduce artifacts by using only the color information that is agreed among the cameras and so would not result in artifacts.

After the projection of color information in 413 is complete, multi-spectral information captured in 404 is also projected onto the three-dimensional surface mesh in the same manner as 413 in process 414. These two types of multi-spectral lights, IR and UV, extract more information than regular white light. In medical applications, IR light can inspect the deep layer of the skin and interact better with hemoglobin, while UV light can differentiate foreign objects on the surface of the skin. With these two types of light captured, the system can project this multi-spectral information onto the three-dimensional surface mesh and obtain the output of complete three-dimensional information in the process 415.

The output complete three-dimensional information of the subject's body part which contains three-dimensional surface shape and location along with color information and multi-spectral information. This output complete three-dimensional information can be used to re-create and visualize the scanned body part under any virtual environment. The output of complete three-dimensional information is precise enough for medical measurements. With the multi-spectral information, this output complete three-dimensional information contains hidden data that is invisible to naked eyes. This output of complete three-dimensional information can be used in the analysis, diagnosis, simulation, or re-creation in a virtual environment.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

The invention claimed is:

1. A method, comprising:
   processing an image of an object being exposed to a lighting condition or a sequence of lighting conditions adapted to extract at least two types of information selectable from a group comprising:
   a silhouette of the object,
   a color of the object,
   a surface orientation of the object, and
   multi-spectral information of the object; and
   forming a three-dimensional model of the object based upon an image's feature cues and information extracted by the lighting condition or the sequence of lighting conditions,
   wherein the surface orientation of the object corresponds to a direction that is substantially perpendicular to a plane representing a given point on the object's surface, and
   wherein the three-dimensional model of the object is formed from a mesh registration, the mesh registration being based on a camera configuration and the image's feature cues.

2. The method as claimed in claim 1, wherein the lighting condition or the sequence of lighting conditions is adapted to extract at least three types of information selectable from the group.

3. The method as claimed in claim 1, wherein the lighting condition or the sequence of lighting conditions is adapted to extract at least the surface orientation of the object.

4. The method as claimed in claim 1, wherein the lighting condition or the sequence of lighting conditions is emitted from a light source facing the object from multiple directions at a substantially uniform distance.

5. The method as claimed in claim 1, wherein the object is a body part.

6. The method as claimed in claim 1, wherein the mesh registration is based on a secondary registration point; the secondary registration point being based on the camera configuration, and a primary registration point; and the camera configuration and the primary registration point are based on the image's feature cues.

7. The method as claimed in claim 1, wherein the information extracted by the lighting condition or the sequence of lighting conditions is applied to the mesh registration to form the three-dimensional model of the object.

8. The method as claimed in claim 1, wherein a plurality of the images are processed and the object is exposed to a plurality of the lighting conditions or a plurality of the sequences of lighting conditions.

9. A device, comprising:
   an image-capturing unit adapted to capture an image of an object substantially synchronously from a plurality of angles;
   a processor adapted to process the image; and
   a lighting unit adapted to expose the object to a lighting condition or a sequence of lighting conditions adapted to extract at least two types of information selectable from a group comprising: a silhouette of the object; a color of the object; a surface orientation of the object; and multi-spectral information of the object, wherein the processor is also adapted to process the image to form a three-dimensional model of the object based upon image's feature cues and information extracted by the lighting condition or the sequence of lighting conditions, and wherein the three-dimensional model of the object is formed from a mesh registration, said mesh registration being based on a camera configuration and the image's feature cues.

10. The device as claimed in claim 9, wherein the lighting unit is a light-emitting pane further adapted to face the object from the multiple directions at a substantially uniform distance, said light-emitting pane being a dome having its internal surface adapted to expose the object to the lighting condition or the sequence of lighting conditions.

11. The device as claimed in claim 10, wherein the dome is a polyhedral dome.

12. The device as claimed in claim 10, wherein the image-capturing unit is attached to the lighting unit.

13. The device as claimed in claim 9, wherein the image-capturing unit is attached to the lighting unit.

14. The device as claimed in claim 9, wherein the lighting condition or the sequence of lighting conditions is adapted to extract at least three types of information selectable from said group.

15. The device as claimed in claim 9, wherein the lighting condition or the sequence of lighting conditions is adapted to extract at least the surface orientation of the object.

16. The device as claimed in claim 9, wherein the mesh registration is based on a secondary registration point; the secondary registration point is based on the camera configuration, and a primary registration point; and the camera configuration and the primary registration point are based on the image's feature cues.

17. The device as claimed in claim 9, wherein the information extracted by the lighting condition or the sequence of lighting conditions is applied to the mesh registration to form the three-dimensional model of the object.

18. The device as claimed in 9, wherein a plurality of the images are processed and the object is exposed to a plurality of the lighting conditions or a plurality of the sequences of lighting conditions.

19. The device as claimed in claim 9, wherein the object is a body part.

* * * * *